(12) United States Patent
Jauer et al.

(10) Patent No.: US 9,074,110 B2
(45) Date of Patent: Jul. 7, 2015

(54) METHOD FOR PRODUCING RELEASE LINERS

(75) Inventors: Stephan Jauer, Göttingen (DE); Birgit Sommer, Norderstedt (DE)

(73) Assignee: TESA SE, Hamburg (DE)

( * ) Notice: Subject to any disclaimer, the term of this patent is extended or adjusted under 35 U.S.C. 154(b) by 689 days.

(21) Appl. No.: 12/993,644

(22) PCT Filed: May 27, 2009

(86) PCT No.: PCT/EP2009/056418
§ 371 (c)(1),
(2), (4) Date: Feb. 7, 2011

(87) PCT Pub. No.: WO2009/150045
PCT Pub. Date: Dec. 17, 2009

(65) Prior Publication Data
US 2011/0186219 A1    Aug. 4, 2011

(30) Foreign Application Priority Data

Jun. 10, 2008 (DE) .......................... 10 2008 027 502

(51) Int. Cl.
*B05D 1/36* (2006.01)
*C09J 7/02* (2006.01)

(52) U.S. Cl.
CPC .......... *C09J 7/0225* (2013.01); *C09J 2483/005* (2013.01)

(58) Field of Classification Search
None
See application file for complete search history.

(56) References Cited

U.S. PATENT DOCUMENTS

| 4,340,647 A * | 7/1982 | Eckberg .......................... 428/429 |
| 4,725,630 A | 2/1988 | Magee et al. |
| 4,980,443 A * | 12/1990 | Kendziorski et al. ........... 528/31 |
| 5,279,860 A * | 1/1994 | Griswold et al. ............. 427/386 |
| 5,691,435 A * | 11/1997 | Herzig et al. .................... 528/15 |
| 2002/0061998 A1* | 5/2002 | Cray et al. ....................... 528/32 |
| 2005/0053727 A1* | 3/2005 | Schlipf et al. .............. 427/421.1 |
| 2009/0156755 A1* | 6/2009 | Herzig et al. ................. 525/478 |
| 2011/0129632 A1* | 6/2011 | Jauer et al. ................... 428/41.8 |

FOREIGN PATENT DOCUMENTS

| DE | 33 16 166 | 11/1983 |
| DE | 38 20 294 | 10/1989 |
| DE | 600 01 779 | 2/2004 |
| DE | 10 2008 027 502 | 12/2009 |
| EP | 0 168 713 | 1/1986 |
| EP | 0 523 660 | 1/1993 |
| JP | 09-169960 | * 6/1997 |
| JP | 9 169960 | 6/1997 |
| JP | 2005 153250 | 6/2005 |

OTHER PUBLICATIONS

Abstracts and machine translation of JP09-169960, Jun. 1997.*
Translation of JP09-169960, Jun. 1997.*
"Chemische Technik, Prozesse und Produkte" [Chemical engineering, processes, and products] by R. Dittmeyer et al., vol. 5, 5th edition, Wiley-VCH, Weinheim, Germany, 2005, chapter 6 5.3.2, pp. 1142).
A. Colas, Silicone Chemistry Overview, Technical Paper, Dow Corning), 1997.

* cited by examiner

*Primary Examiner* — Erma Cameron
(74) *Attorney, Agent, or Firm* — Norris McLaughlin & Marcus, P.A.

(57) ABSTRACT

The invention relates to a method for producing a release liner which comprises at least one crosslinked silicon coating based on addition crosslinking silicone polysiloxanes and hydrosilylation catalysts, the silicon coating being treated with compounds that are effective as catalyst poisons for hydrosilylation catalysts. The invention further relates to a release liner which can be obtained according to said method and to the use of compounds that are effective as catalyst poisons for hydrosilylation catalysts for treating a silicon coating present on a release liner to control the release forces with which the release liner can be released from a pressure-sensitive adhesive composition that has been coated onto it.

9 Claims, No Drawings

METHOD FOR PRODUCING RELEASE LINERS

This application is a 371 of International Patent Application No. PCT/EP2009/056418, filed May 27, 2009, which, in turn, claims priority of Germany Patent Application No. 10 2008 027 502.6, filed Jun. 10, 2008, the entire contents of which patent applications are incorporated herein by reference.

The invention relates to a process for producing release liners for regulating peel forces, to corresponding release liners, and also to the use of contact poisons for the corresponding regulation of peel force.

Adhesive tapes coated on one or both sides with adhesives are mostly, at the end of the production process, wound up to give a roll in the form of an archimedean spiral. A method used for double-sided adhesive tapes in order to prevent the adhesive masses from coming into contact with one another, or for single-sided adhesive tapes in order to prevent adhesion of the adhesive mass to backing, applies the adhesive tapes to a protective covering material (also termed release material) before the winding process, where this material is wound up together with the adhesive tape. The person skilled in the art uses the term release liner or liner for protective covering materials of this type. Liners are used not only for protective covering of single- or double-sided adhesive tapes but also for covering labels.

A liner (release paper, release foil) is not a constituent of an adhesive tape or label, but instead is merely an aid to the production or storage of these, or for further processing via punching. A liner moreover differs from an adhesive-tape backing in having no firm bonding to an adhesive layer.

Antiadhesive coating compositions are widely used for producing liners in the coating in particular of sheet-like materials, such as papers or foils, in order to reduce the tendency of adherent products to adhere to said surfaces.

During this process, when a double-sided adhesive tape equipped with a liner is unrolled the normal procedure is that the open, i.e. liner-free, pressure-sensitive adhesive-mass side thereof is stuck to a substrate. The other pressure-sensitive adhesive-mass side still adheres to the coated surface of the liner to a sufficient extent to permit handling of the adhesive tape.

However, it must be possible to peel the liner from the adhesive tape. It is not permissible that the liner itself or the peeling of the liner causes any significant impairment of the pressure-sensitive adhesive mass in relation to its subsequent use.

At the same time, it is important that the antiadhesive coating (also termed release coating) is stable on the liner, i.e. that the release properties are stable, over long periods, in order to ensure that said coating functions, and also to ensure that the pressure-sensitive adhesive mass covered by the liner has the right properties.

Crosslinkable silicone systems are often used as release coating. Among these are mixtures made of crosslinking catalysts and of what are known as heat-curable condensation- or addition-crosslinking polysiloxanes. Crosslinking catalysts often present in the composition in the case of condensation-crosslinking silicone systems are tin compounds, such as dibutyltin diacetate.

Silicone-based release coatings based on addition crosslinking can be cured via hydrosilylation. These release systems usually encompass the following constituents: an alkenylated polydiorganosiloxane (in particular linear polymers having terminal alkenyl groups), a polyorganohydrosiloxane crosslinking agent, and also a hydrosilylation catalyst.

Catalysts that have become well established for addition-crosslinking silicone systems are platinum or platinum compounds, an example being Karstedt catalyst [a Pt(0)-complex compound].

It is also possible to use photoactive catalysts, known as photoinitiators, in combination with UV-curable cationically crosslinking siloxanes based on epoxy and/or on vinyl ether, or UV-curable siloxanes that crosslink by a free-radical route, e.g. acrylate-modified siloxanes. It is equally possible to use electron-beam-curable silicone acrylates. Systems of this type can also comprise further additions, such as stabilizers or flow aids, if these are required by the application.

There are moreover various types of known organopolysiloxane compositions which crosslink via heating or irradiation. Mention may be made of the compositions described by way of example in DE 600 01 779 T2, which crosslink via an addition reaction, namely via heat-treatment of a mixture made of an organopolysiloxane having hydrogen atoms bonded directly to the silicon atoms and of an organopolysiloxane having vinyl groups bonded directly to the silicon atoms, in the presence of a hydrosilylation catalyst.

It is also possible to use photopolymerizable organopolysiloxane compositions. By way of example, mention may be made of compositions which are crosslinked via the reaction between organopolysiloxanes having hydro-carbon moieties that are bonded directly to the silicon atoms and that have substitution by (meth)acrylate groups, and in the presence of a photosensitizer (see EP 0 168 713 B1 or DE 38 20 294 C1). It is also possible to use compositions in which the crosslinking reaction is brought about between organopolysiloxanes having hydrocarbons that are bonded directly to the silicon atoms and that have substitution by mercapto groups, and organopolysiloxanes having vinyl groups bonded directly to the silicon atoms, in the presence of a photosensitizer. Compositions of this type are described by way of example in U.S. Pat. No. 4,725,630 A1.

When the organopolysiloxane compositions described by way of example in DE 33 16 166 C1 are used, where these have hydrocarbon moieties that are bonded directly to the silicon atoms and that have substitution by epoxy groups, the crosslinking reaction is induced via liberation of a catalytic amount of acid, which is obtained via photodecomposition of added onium salt catalysts. Other organopolysiloxane compositions that can be cured via a cationic mechanism are materials which by way of example have propenyloxysiloxane terminal groups.

Among the silicones mentioned, the addition-crosslinking silicones are the most important in economic terms. However, an undesired property of these systems is that they are susceptible to catalyst poisons, e.g. heavy metal compounds, sulfur compounds, and nitrogen compounds (in which connection cf. "Chemische Technik, Prozesse and Produkte" [Chemical engineering, processes, and products] by R. Dittmeyer et al., volume 5, 5th edition, Wiley-VCH, Weinheim, Germany, 2005, chapter 6-5.3.2, pages 1142). As a general rule, electron donors can be regarded as platinum poisons (A. Colas, Silicone Chemistry Overview, Technical Paper, Dow Corning). Accordingly, phosphorus compounds must also be considered as platinum poisons, examples being phosphines and phosphites. When catalyst poisons are present, the crosslinking reaction between the various constituents of a silicone release coating ceases or becomes very incomplete.

The presence of contact poisons, in particular of platinum poisons, is therefore strictly avoided during the production of antiadhesive silicone coatings.

However, there are a number of disadvantages with the practical use of the abovementioned antiadhesive silicone coatings.

By way of example, MQ silicone resins (silicone-methyl-silicone-rubber resins) are usually used to adjust the level of peel force for a pressure-sensitive adhesive mass with respect to a silicone release liner. The level of peel forces demanded varies with the requirements placed upon the product. It is therefore necessary to use a plurality of release liners with various MQ resin contents, and therefore also to keep these in inventory.

Furthermore, it is often impossible to use release liners immediately after production, because the properties of the liner have not yet reached a constant level. This is particularly apparent from measurements of release forces. These generally fall during the first few days and weeks after production, before reaching a constant level. The effect is termed "post-curing" or postcrosslinking. The time between production of the release liner and coating with pressure-sensitive adhesive mass is correspondingly called the post-curing time, or post-crosslinking time, or else maturation time. The maturation time can amount to a number of weeks, varying with the requirements placed upon the release liner and with the pressure-sensitive adhesive mass used on the release liner. A result of the maturation time required is that the release liners produced have to be stored, with resultant storage costs.

Another problem area results from the fact that the peel forces in laminates of release liners and pressure-sensitive adhesive masses are sometimes observed to rise during storage. The person skilled in the art knows this effect as "adhesive lock-up" or, specifically for acrylates, "acrylic lock-up". A result of this effect is sometimes that it is difficult or even impossible to peel the release liner from the pressure-sensitive adhesive mass, and that the product therefore becomes useless.

It is an object of the invention to avoid the disadvantages of the prior art or at least to reduce their level. In particular, it is desirable
- to have the ability to vary peel forces between an acrylate-based pressure-sensitive adhesive mass on a liner equipped with a silicone coating and said liner, without affecting the adhesion of the pressure-sensitive adhesive mass,
- to shorten the maturation time needed prior to use of the release liner, and/or
- to inhibit acrylic lock-up.

The object is achieved via treatment of silicone coatings on release liners with compounds which act as contact poisons for hydrosilylation catalysts.

These hydrosilylation catalysts encompass by way of example ruthenium, rhodium, palladium, osmium, indium, or in particular platinum, complexes of these, and compounds and/or catalyst systems made of a plurality of said catalysts.

It is particularly preferable to select contact poisons which are effective for frequently used hydrosilylation catalysts, e.g. chloroplatinic acid, platinum acetyl-acetonate, complexes of platinum(II) halides with unsaturated compounds—for example ethylene, propylene, organovinylsiloxanes, styrene, hexamethyldi-platinum, $PtCl_2PtCl_3$, $Pt(CN)_3$.

The invention in one embodiment accordingly provides a process for producing a release liner encompassing at least one crosslinked silicone coating based on addition-crosslinking polysiloxanes, and also hydrosilylation catalysts, where the silicone coating is treated with compounds which act as contact poisons for the hydrosilylation catalysts. The contact poisons used particularly preferably comprise sulfur-, nitrogen-, and/or phosphorus-containing compounds.

For the purposes of this specification, the term "production" also includes the modification of a preexisting, untreated release liner via the process steps of the invention, as well as production of a release liner without use of a preexisting liner, where both processes produce a new product.

A feature of another embodiment of the process of the invention is that the hydrosilylation catalyst is platinum, a platinum-complex compound or a platinum compound.

In particular, use is made of additives which act as contact poisons for platinum-containing catalysts. Compounds particularly suitable for this purpose are sulfur-, nitrogen-, and/or phosphorus-containing compounds which act as contact poisons for platinum-containing catalysts.

Other embodiments provide refinements of the subject matter of the invention, release liners obtainable via the process of the invention, and also the use of corresponding contact poisons to regulate the peel forces required to peel the liner from the pressure-sensitive adhesive mass.

The expression "regulate the peel forces" here encompasses the adjustment of the peel forces to a certain level, the reduction of the maturation time, i.e. the time between the production of the release liner and contact with a pressure-sensitive adhesive-mass layer laid on the release liner (i.e. the chronological adjustment of the peel forces to a value suitable for the application), and also the inhibition of reactions between a pressure-sensitive adhesive mass laid on the release liner and the silicone (i.e. the inhibition of the aging of the system in this respect and therefore the chronological alteration of the peel forces). Accordingly, the use indicated includes all of the procedures which bring about at least one of the abovementioned effects, and preferably all of the abovementioned effects.

The presence of platinum poisons leads to partial or complete inhibition of a platinum-catalyzed crosslinking reaction between constituents of the adhesive mass and the Si—H groups of the silicone crosslinking agent located within the release liner. In other words, the platinum poisons can be used to influence the reactions at the silicone/adhesive mass interface, and thus the peel forces.

In the invention, the release liner has been equipped with a silicone coating. It is preferable that the silicone coating provided on the liner is an addition-crosslinking silicone.

Contact poisons or catalyst poisons are substances which cover the surface of a catalyst and thus temporarily or permanently reduce the level of its action or else switch the catalyst off entirely, i.e. substances which deactivate catalysts on contact with these.

The contact poisons, in particular platinum poisons, used in the invention preferably comprise one or more compounds selected from the following list:
amines (e.g. triethylamine, melamine, triethanolamine),
amides (e.g. dimethylformamide),
cyanates,
nitriles (e.g. adiponitrile),
oximes (e.g. 2-butoxime),
nitroso compounds (e.g. alpha-nitroso-beta-naphthol),
chelates (e.g. EDTA—ethylenediamine tetraacetate, NTA—nitriloacetic acid),
oxazolines (e.g. 1,4-bisoxazolinebenzene),
thio compounds (e.g. thioacetic acid, allylthiourea, dodecyl mercaptan, didodecyl 3,3'-thiopropionate),
disulfides (e.g. dibenzyl disulfide),
tin salts (e.g. those used with tin-catalyzed silicone release coatings),
phosphines (e.g. triphenylphosphine),
phosphites (e.g. triphenyl phosphite), arsenic compounds (e.g. triphenylarsine),
antimony compounds (e.g. triphenylstibine),
selenides (e.g. diphenyl selenide).

Other contact poisons that can be used are non-aromatic heterocycles having a free electron pair.

Contact poisons that can be used with particular preference in the invention, in particular platinum poisons, are selected from the list consisting of the following substances:

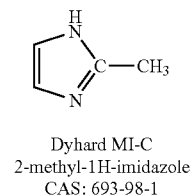
Dyhard MI-C
2-methyl-1H-imidazole
CAS: 693-98-1

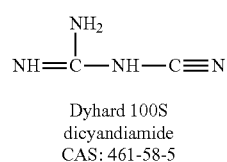
Dyhard 100S
dicyandiamide
CAS: 461-58-5

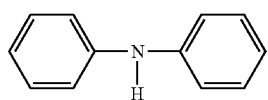
diphenylamine
CAS: 122-39-4

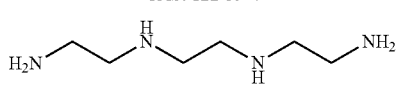
triethylentetramine
CAS: 112-24-3

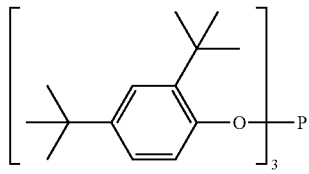
Irgafos 168
tris(2,4-di-tert-butylphenyl) phosphite
CAS: 31570-04-4

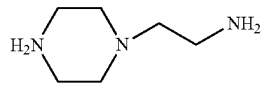
N-(2-aminoethyl)piperazine
CAS: 140-31-8

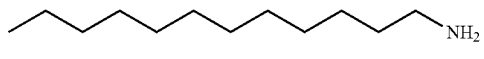
dodecylamine
CAS: 124-22-1

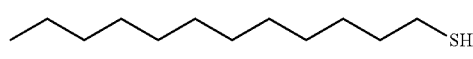
dodecyl mercaptan
CAS: 112-55-0

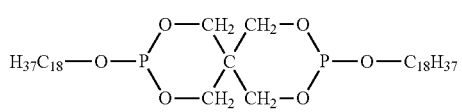
Weston 618 F
distearyl pentaerythritol diphosphite
CAS: 3806-34-6

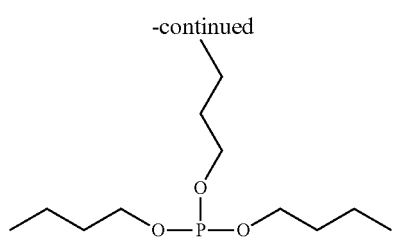
tributyl phosphite
CAS: 102-85-2

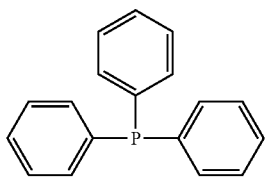
triphenylphosphine
CAS: 603-35-0

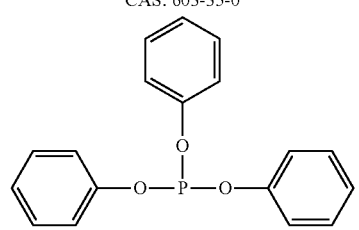
triphenyl phosphite
CAS: 101-02-0

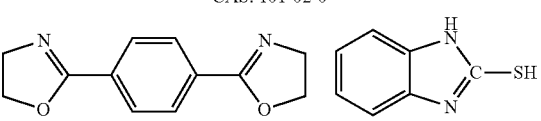

1,4-bisoxazolinebenzene

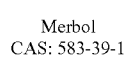
Merbol
CAS: 583-39-1

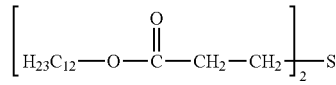
Irganox PS 800
didodecyl 3,3'-thiepropionate
CAS: 123-28-4

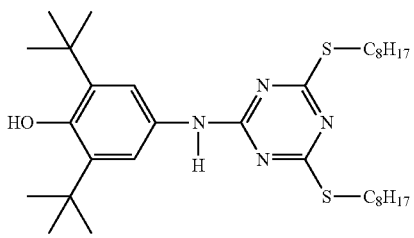
Irganox 565
2,4-bis(n-octylthio)-6-(4-hydroxy-3,5-di-tert-butyl-anilino)-1,3,5-triazine
CAS: 991-84-4

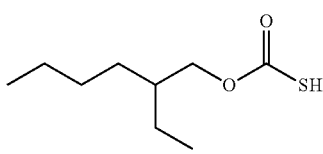
CAS: 25103-09-7
2-ethylhexyl thioglycolate

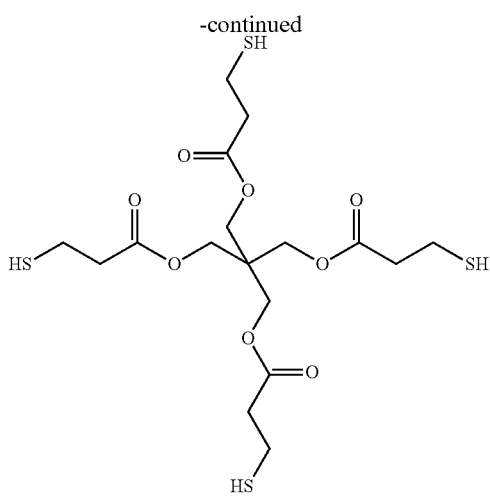

CAS: 231-472-8
pentaerythritol tetra(3-mercaptopropionate)

Particularly advantageous silicones are explained in more detail below.

The silicone-based release coatings used in the invention are based on addition crosslinking, therefore being those that can be cured via hydrosilylation—in particular thermally. These release systems usually encompass the following constituents: an alkenylated polydiorganosiloxane (in particular linear polymers having terminal alkenyl groups), a polyorganohydrosiloxane crosslinking agent, and also a hydrosilylation catalyst, in particular of the type indicated above.

Heat-curing release coatings which are based on addition-crosslinking silicones and which are advantageous in the invention are often multicomponent systems, where these typically are composed of the following components:

a) a linear or branched polydimethylsiloxane which is composed of about 80 to 200 dimethylsiloxane units and has termination by vinyldimethylsiloxy units at the chain ends, or a linear polydimethylsiloxane which is composed of about 80 to 200 dimethylsiloxane units and about 1 to 10 methyl-vinylsiloxane units, and which has termination by vinyldimethylsiloxy units at the chain ends. Examples of typical representative materials are solvent-free, addition-crosslinking silicone oils, such as DEHESIVE® 920, 912 or 610, all of which are available commercially from Wacker Chemie GmbH, or SYL-OFF® SL 9104, available commercially from Dow Corning GmbH.

b) A linear, cyclic, or branched crosslinking agent, or any desired mixture of these, where the crosslinking agent is usually composed of methylhydrosiloxy units and of dimethylsiloxy units or only of methylhydrosiloxy units, and the chain ends have been saturated with trimethylsiloxy groups or with dimethylhydrosiloxy groups. Examples of typical representatives of this class of product are hydropolysiloxanes having high content of reactive Si—H, e.g. the crosslinking agents V24, V90, or V06 available commercially from Wacker Chemie GmbH, or the crosslinking agent SYL-OFF® 7689, available commercially from Dow Corning GmbH.

c) An MQ silicone resin which also has, as M unit, alongside the trimethylsiloxy units usually used, vinyldimethylsiloxy units. Examples of typical representatives of this group are the release-force regulators CRA® 17 or CRA® 42, available commercially from Wacker Chemie GmbH, or SYL-OFF® SL 9154, available commercially from Dow Corning GmbH.

d) A silicone-soluble platinum catalyst, e.g. a platinum-divinyltetramethyldisiloxane complex, which is usually termed Karstedt complex and which is available commercially by way of example as catalyst OL from Wacker Chemie GmbH or else SYL-OFF® 4000 from Dow Corning GmbH.

Other suitable compositions are those described by way of example in the abovementioned DE 600 01 779 T2, and in particular in claim 12 of that document, and also paragraphs [0036] to [0050]. These release systems crosslink via an addition reaction, and specifically via heat-treatment of a mixture made of an organopolysiloxane having hydrogen atoms bonded directly to the silicon atoms and of an organopolysiloxane having vinyl groups bonded directly to the silicon atoms, in the presence of a hydrosilylation catalyst.

The silicones are applied to the backing and thus form a continuous silicone coating.

The backing material used for the liner can comprise papers or foils. Foils used here comprise polyolefin foils (polypropylene foils and polyethylene foils) or polyester foils.

There are various ways of treating the silicone layer(s). When the contact poison is applied to the silicone layer(s), in particular by wiping, spraying, printing, rolling, or any other application method, this can take place without or with addition of foreign substances, such as carrier gases or solvents or the like. The contact poison can also be applied—in the presence or absence of foreign substances—from the gas phase, for example from a vapor, or in the form of aerosol—in the presence of an appropriate foreign substance—for example in the form of mist or in the form of vapor.

Contact poisons which are liquid can be applied directly, in particular via one of the above-mentioned processes.

Other methods can also be used for the treatment of the silicone layers with the contact poisons, for example application of the contact poisons to the reverse side of the liner and migration of these through the backing material into the silicone composition.

The process of the invention can in particular be advantageously continued by applying a pressure-sensitive adhesive-mass layer to the coated silicone layer.

In an alternative procedure, it is preferable that the release liner is laminated with the treated silicone layer onto a pressure-sensitive adhesive-mass layer.

The invention further provides release liners obtainable via the process of the invention. These release liners have at least one antiadhesive silicone layer based on addition-crosslinking polysiloxanes (in which connection see the information presented above). The silicone layer further encompasses hydrosilylation catalysts and, if appropriate, crosslinking agents, in particular polyorganohydrosiloxane compounds.

After the crosslinking of the silicone layer, the release liners have been crosslinked in the invention as explained above and then have been treated with the contact poisons. This gives release liners superior to those of the prior art, in particular in that the disadvantages described at an earlier stage above of the prior art have been mitigated or entirely avoided. The hydrosilylation catalysts of the release liners of the invention have been—at least to some extent—poisoned, i.e. rendered ineffective, by the contact poisons. The greater the effect of compounds that act as poisons (in particular those that act as poisons for platinum), the greater the inhibition of the reaction between the silicone coating and a pressure-sensitive adhesive mass in contact with the release liner, the result being that the forces required to peel the liner from the pressure-sensitive adhesive masses are smaller—when compared with those for untreated release liners.

The invention also provides the use of the above-mentioned contact poisons, i.e. of compounds which act as contact poisons for hydrosilylation catalysts, for treatment of a silicone coating located on a release liner in order to regulate the forces required to peel the release liner from a pressure-sensitive adhesive mass coated or laminated onto the liner; in particular in a process as explained above. In particular, the invention provides the use of compounds which act as contact poisons for platinum-containing catalysts in order to treat a silicone coating located on a release liner, in order to regulate the forces required to peel the release liner from a pressure-sensitive adhesive mass coated or laminated onto the liner.

The invention finally provides the use of the release liners of the invention in an adhesive tape.

EXAMPLES

General Procedure

Production of Release Liners

A crosslinkable silicone composition composed of 70 parts of Dow Corning SYL-OFF® SL 9104, 30 parts of Dow Corning SYL-OFF® SL 9154, 8.9 parts of Dow Corning SYL-OFF® SL 7689, and 1.6 parts of Dow Corning SYL-OFF® 4000 was applied to a PET foil (Lumirror 60.01, 75 µm, Toray) with the aid of a No. 1 doctor from 30% strength solution in gasoline. The silicone was crosslinked for 30 seconds at 150° C. The amount of silicone applied was adjusted to 1.3 g/m$^2$. Unless otherwise stated, there were two days of maturation time before the release liner was pretreated as described in the individual examples, and coated with adhesive mass.

Production of Adhesive Mass 0.7 kg of acrylic acid, 33.95 kg of 2-ethylhexyl acrylate, 33.95 kg of butyl acrylate, 1.4 kg of glycidyl methacrylate, and 23.35 kg of gasoline with boiling point range 60/95, and also 23.35 kg of acetone were used as initial charge in a free-radical polymerization reaction in a conventional 200 L reactor. After nitrogen gas had been passed through the reaction solution for 45 minutes, with stirring, the reactor was heated to 58° C., and 0.07 kg of Vazo 67™ (DuPont) dissolved in 0.35 kg of acetone was added. The external heating bath was then heated to 75° C., and the reaction was carried out at this constant external temperature. After 1 h of reaction time, 0.07 kg of Vazo 67™ (DuPont) dissolved in 0.35 kg of acetone was added. After 2.5 h of reaction time, 0.091 kg of dicyclohexyl peroxydicarbonate (Perkadox 16®, Akzo Nobel) was added. After 3.5 h of reaction time, 10.50 kg of gasoline with boiling point range 60/95 were added as diluent. The mixture was further diluted after 7.5 h by adding 10.5 kg of gasoline with boiling point range 60/95. After 24 h of reaction time, the polymerization reaction was terminated and the reaction vessel was cooled to room temperature.

The polymer was then blended with 37.5% by weight of Sylvares TP 95 (terpene-phenol resin with softening point 95° C.) and 0.3% by weight of ZnCl$_2$ (% by weight in each case based on the polymer).

Preparation of Test Strips

The pressure-sensitive adhesive mass described above was applied to the pretreated release foils with the aid of a spreader bar. After evaporation of most of the solvent, the adhesive mass was dried in a convection oven at 120° C. for 15 minutes. The selected application weight of the composition was 50 g/m$^2$. After the specimens had cooled, a PET foil of thickness 23 µm (Polibond D23H, Polifibra Folien GmbH) was laminated to the adhesive mass, and the composite was cut into strips of width 2 cm.

Description of Test

The force required to peel the PET foil and adhesive mass from the release liner was measured at an angle of 180° with peel rate 0.3 m/min, at 23±1° C. and at relative humidity 50±5%. Peel force was measured about 24 hours after coating of the release paper with the adhesive mass.

Comparative Example 1

The release liner described above was wiped a number of times with a toluene-saturated tissue.

Comparative Example 2

In contrast to the general description, the release liner described above was stored for 7 days. The release liner was then wiped a number of times with a toluene-saturated tissue.

Comparative Example 3

In contrast to the general description, the release liner described above was stored for 14 days. The release liner was then wiped a number of times with a toluene-saturated tissue.

Comparative Example 4

In contrast to the general description, the release liner described above was stored for 21 days. The release liner was then wiped a number of times with a toluene-saturated tissue.

Comparative Example 5

In contrast to the general description, the release liner described above was stored for 42 days. The release liner was then wiped a number of times with a toluene-saturated tissue.

Inventive Example 1

The release liner described above was wiped a number of times with a tissue saturated with a 1% strength solution of Irganox 1726 in toluene.

Inventive Example 2

The release liner described above was wiped a number of times with a tissue saturated with a 10% strength solution of Irganox 565 in toluene.

Inventive Example 3

The release liner described above was wiped a number of times with a tissue saturated with a 1% strength solution of Irganox PS800 in toluene.

Inventive Example 4

The release liner described above was wiped a number of times with a tissue saturated with a 1% strength solution of Merbol in toluene.

Inventive Example 5

The release liner described above was wiped a number of times with a tissue saturated with a 1% strength solution of Weston 168F in toluene.

Inventive Example 6

The release liner described above was wiped a number of times with a tissue saturated with a 1% strength solution of triphenyl phosphite in toluene.

Inventive Example 7

The release liner described above was wiped a number of times with a tissue saturated with a 1% strength solution of triphenylphosphine in toluene.

Inventive Example 8

The release liner described above was wiped a number of times with a tissue saturated with a 1% strength solution of pentaerythritol tetra(3-mercaptopropionate) in toluene.

Inventive Example 9

The release liner described above was wiped a number of times with a tissue saturated with a 1% strength solution of 2-ethylhexyl thioglycolate in toluene.

Inventive Example 10

The release liner described above was wiped a number of times with a tissue saturated with a 1% strength solution of dodecyl mercaptan in toluene.

TABLE 1

| Experiment | Peel force [cN/cm] |
| --- | --- |
| Comparative example 1 | 100 |
| Comparative example 2 | 65 |
| Comparative example 3 | 43 |
| Comparative example 4 | 25 |
| Comparative example 5 | 14 |
| Inventive example 1 | 27 |
| Inventive example 2 | 19 |
| Inventive example 3 | 48 |
| Inventive example 4 | 12 |
| Inventive example 5 | 25 |
| Inventive example 6 | 25 |
| Inventive example 7 | 27 |
| Inventive example 8 | 15 |
| Inventive example 9 | 18 |
| Inventive example 10 | 25 |

The comparative examples showed that the peel force for the acrylate adhesive mass falls as the maturation time for the release liner increases.

The inventive examples show that treatment of the two-day-old release liner with platinum poisons brings the peel forces to a level which is not observed for untreated release liners until a number of weeks have passed.

The contact poisons studied were capable of achieving the object of the invention in excellent fashion, without exhibiting any substantial effect on the suitability of the pressure-sensitive adhesive masses for their respective use. The thio compounds, in particular dodecyl mercaptan and didodecyl 3,3'-thiopropionate were found to have particularly excellent suitability as contact poisons. These compounds exhibited the smallest effect on the adhesive properties of the adhesive mass in relation to its respective field of use.

What is claimed is:

1. A process for producing a release liner for a pressure-sensitive adhesive, said release liner comprising at least one crosslinked silicone coating based on an addition-crosslinking polysiloxane, and also a hydrosilylation catalyst, said process comprising: before applying said pressure-sensitive adhesive to said release liner, treating the silicone coating with a composition comprising (A) a compound that acts as a contact poison for the hydrosilylation catalyst and (B) an additional substance, wherein said treating comprises applying the composition to the silicone coating by wiping, spraying, printing, rolling, or from the gas phase, or in the form of an aerosol.

2. The process as claimed in claim 1, wherein
the hydrosilylation catalyst is platinum, a platinum-complex compound or a platinum compound.

3. The process as claimed in claim 1, wherein the contact poisons are sulfur-, nitrogen-, and/or phosphorus-containing compounds.

4. The process as claimed in claim 1, which further comprises applying a pressure-sensitive adhesive layer to the silicone coating after said treating.

5. The process according to claim 1, which further comprises laminating the release liner onto a pressure-sensitive adhesive layer after said treating.

6. A release liner obtained by a process as claimed in claim 1.

7. The process as claimed in claim 1, wherein the additional substance is a carrier gas or a solvent.

8. Method for regulating the peel forces required to peel a release liner comprising a silicone coating from a pressure-sensitive adhesive coated onto the liner, said silicone coating comprising a hydrosilylation catalyst, said method comprising prior to coating the pressure-sensitive adhesive onto the liner treating the silicone coating with a composition comprising (A) one or more compounds which act as contact poisons for hydrosilylation catalysts and (B) an additional substance, wherein said treating comprises applying the composition to the silicone coating by wiping, spraying, printing, rolling, or from the gas phase, or in the form of an aerosol.

9. Method for regulating the peel forces required to peel a release liner comprising a silicone coating from a pressure-sensitive adhesive coated or laminated onto the liner, said silicone coating comprising a platinum-containing catalyst, said method comprising prior to coating or laminating the pressure-sensitive adhesive onto the liner treating the silicone coating with a composition comprising (A) one or more compounds which act as contact poisons for platinum-containing catalysts and (B) an additional substance, wherein said treating comprises applying the composition to the silicone coating by wiping, spraying, printing, rolling, or from the gas phase, or in the form of an aerosol.

* * * * *

UNITED STATES PATENT AND TRADEMARK OFFICE
CERTIFICATE OF CORRECTION

| | | |
|---|---|---|
| PATENT NO. | : 9,074,110 B2 | Page 1 of 1 |
| APPLICATION NO. | : 12/993644 | |
| DATED | : July 7, 2015 | |
| INVENTOR(S) | : Jauer et al. | |

It is certified that error appears in the above-identified patent and that said Letters Patent is hereby corrected as shown below:

In the specification

Column 6, lines 44, "thiepropionate" -- should read -- thiopropionate --.

Signed and Sealed this
Eighth Day of March, 2016

Michelle K. Lee
*Director of the United States Patent and Trademark Office*